US006780451B2

(12) United States Patent
Davis et al.

(10) Patent No.: US 6,780,451 B2
(45) Date of Patent: Aug. 24, 2004

(54) CITRUS JUICE VESICLE SEPARATION METHOD AND SYSTEM

(75) Inventors: Craig L. Davis, Davenport, FL (US); Mark Thomas, Lake Alfred, FL (US); Shi-Chiang Pao, Winter Haven, FL (US)

(73) Assignee: Florida Department of Citrus, Lakeland, FL (US)

( * ) Notice: Subject to any disclaimer, the term of this patent is extended or adjusted under 35 U.S.C. 154(b) by 176 days.

(21) Appl. No.: 10/136,217

(22) Filed: May 1, 2002

(65) Prior Publication Data

US 2003/0207011 A1 Nov. 6, 2003

(51) Int. Cl.[7] ............................. A23N 1/00; A23N 4/00
(52) U.S. Cl. ...................... 426/481; 426/482; 426/518
(58) Field of Search ................................. 426/481, 482, 426/518

(56) References Cited

U.S. PATENT DOCUMENTS

| | | | |
|---|---|---|---|
| 1,731,476 | A | 10/1929 | Stevenson |
| 3,246,993 | A | 4/1966 | Webster et al. |
| 4,294,861 | A | 10/1981 | Ifuku et al. |
| 4,587,126 | A | 5/1986 | Patton et al. |
| 4,738,194 | A | 4/1988 | Ando et al. |
| 4,873,106 | A | 10/1989 | Kolodesh et al. |

OTHER PUBLICATIONS

Pao et al., "Enhancing Microbiological Safety of Fresh Orange Juice by Fruit Immersion in Hot Water and Chemical Sanitizers," Journal of Food Protection, vol. 62, No. 7, pps. 756–760, 1999.

Pao et al., "Maximizing Microbiological Quality of Fresh Orange Juice by Processing Sanitation and Fruit Surface Treatments," Dairy, Food and Environmental Sanitation, vol. 21, No. 4, pps. 287–291, 2001.

Wantanabe et al., "Cryogenic Separation of Citrus Fruit Into Individual Juice Sars," Journal of Food Process Engineering 9, pps. 221–229, Food & Nutrition Press Inc., 1987.

FlavorFresh Fruit Made Easy, Frozen, "The Great Taste of FlavorFresh Fruit Throughout the Year," [online] Treelinks Foods retrieved on Aug. 2, 2002. Retrieved from the Internet <URL: http://www.flavorfresh.com/frozen.html>, Copyright Treelinks Foods [no date provided].

FlavorFresh Fruit product brochure, online, retrieved from http://www.flavorfresh.com/frozen.html, retrieved on Oct. 7, 2002, © 1999.

Cargill Citro Pure product brochure, Product Information, Orange Pulp Cells, Frozen.

Cargill Citro product brochure, Product Information, Colored Grapefruit Pulp Cells, Frozen.

*Primary Examiner*—Anthony Weier
(74) *Attorney, Agent, or Firm*—Allen, Dyer, Doppelt, Milbrath & Gilchrist, P.A.

(57) ABSTRACT

A method for separating juice vesicles from a citrus fruit includes the step of forming a plurality of generally circumferential scores between a stem end and a stylar end of a citrus fruit. Preferably each score extends at least through a flavedo of a peel of the fruit. Next the fruit is cut into a plurality of slices in a direction normal to a longitudinal axis defined by the stem end and the stylar end. The slices are then frozen, and an impulsive force is applied to the slices to form a plurality of fruit components. These fruit components comprise juice vesicles and other fruit components, such as the peel, connective membranes, and seeds. The juice vesicles are then mechanically separated from the other fruit components.

19 Claims, 3 Drawing Sheets

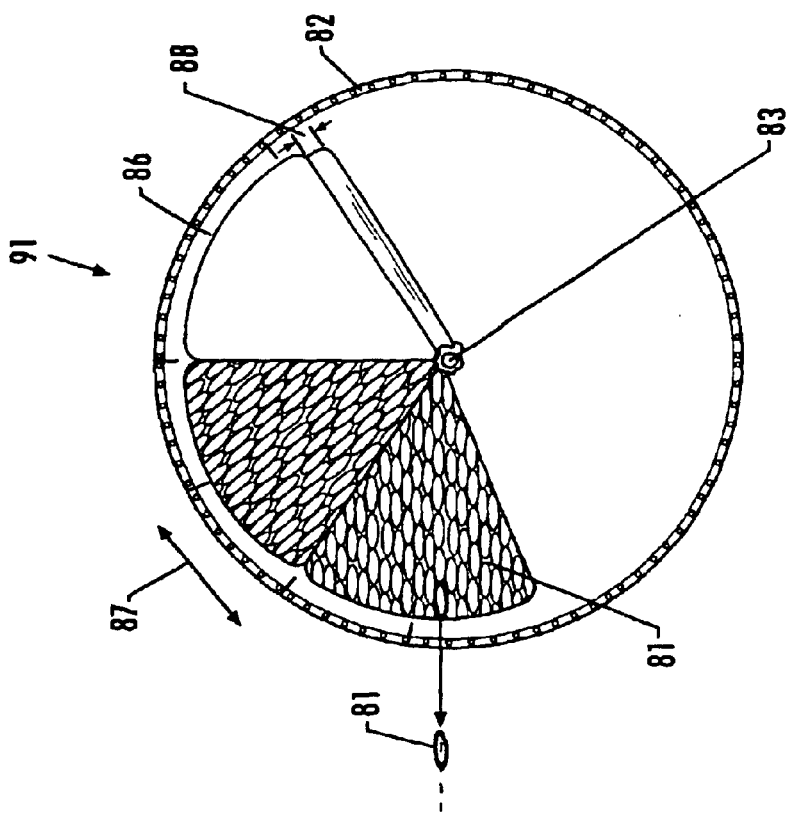
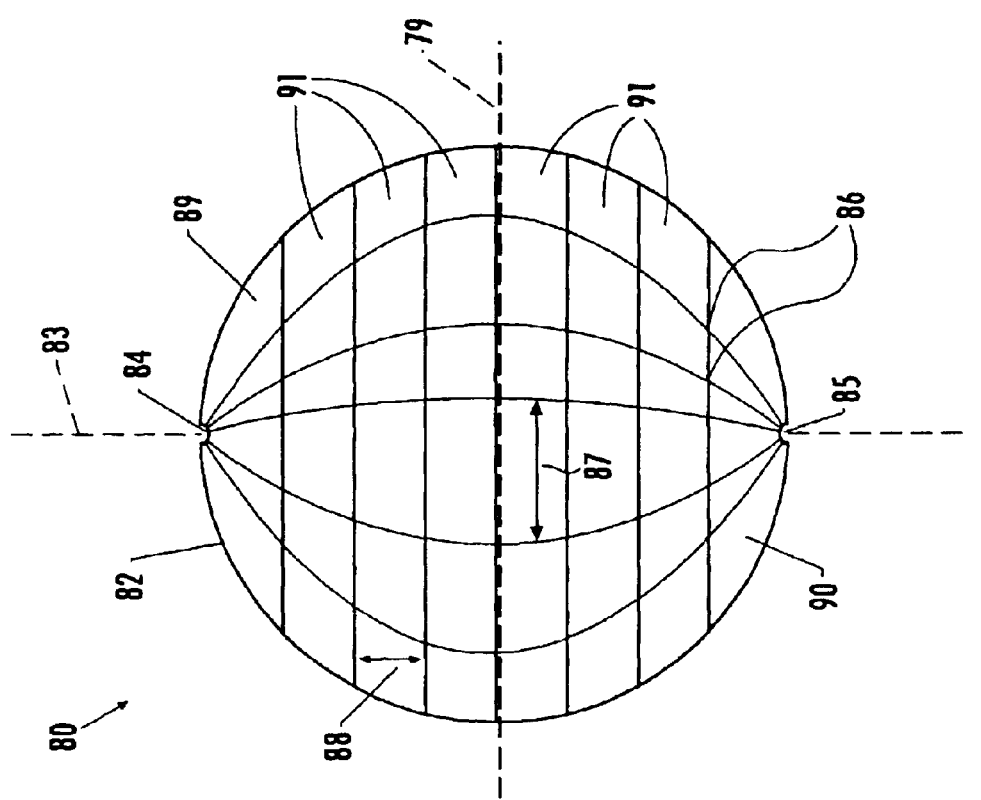
FIG. 4
FIG. 3

CITRUS JUICE VESICLE SEPARATION METHOD AND SYSTEM

BACKGROUND OF THE INVENTION

1. Field of the Invention

The present invention relates to methods for preparing food products, and, more particularly, to such a method for preparing a food product from citrus fruit.

2. Description of Related Art

Additional uses for foods are often sought in order to enhance a product's desirability and marketability. Such foods include produce, namely, citrus fruits. Consumer demand for freshness and convenience has generated interest in minimally processed citrus products, including individually separated juice vesicles.

In the past, mechanical techniques have been known to separate fresh juice vesicles by cutting and rotating devices (U.S. Pat. No. 2,510,679). Such techniques tend to rupture the tender juice sacs, leaving a less desirable product. Stephenson (U.S. Pat. No. 1,731,476) teaches freezing fruit and then crushing it to break apart the peel and the remainder of the fruit, thereby separating the peel from the remainder of the fruit. The apparatus of Ifuku et al. (U.S. Pat. No. 4,294,861) cuts the fruit into pieces and uses fluid under pressure to separate the sacs. Ando (U.S. Pat. No. 4,738,194) discloses immersing the fruit in a cryogen, crushing the frozen fruit, and separating the juice sacs from the rest of the fruit. Kolodesh et al. (U.S. Pat. No. 4,873,106) disclose cutting fruit in half and then coring the fruit halves. A rotating screen through which juice sacs pass separates the sacs from the rest of the fruit.

Chemical separation techniques have also been applied (U.S. Pat. Nos. 4,139,651 and 4,560,572) for reducing the force required to achieve separation. The method of Webster et al. (U.S. Pat. No. 3,246,993) includes peeling the fruit, immersing the fruit in a cryogen, performing thermal shock freezing, removing the frozen fruit from the cryogen, and separating out the juice cells by agitation.

The drawbacks of the previous methods known in the art include loss of flavor, expense associated with complex apparatus, and loss of vesicle integrity.

SUMMARY OF THE INVENTION

It is therefore an object of the present invention to provide a method and system for separating intact citrus juice vesicles from citrus fruit.

It is a further object to provide such a method and system that have improved efficiency.

It is another object to provide such a method and system that do not require peeling of the fruit.

It is also an object to provide such a method and system that have superior flavor retention.

It is an additional object to provide such a method and system that use essentially neither acid nor alkali.

A further object is to provide a method that also yields high-quality usable byproducts.

These and other objects are achieved by the present invention, a method for separating juice vesicles from a citrus fruit. The method comprises the step of forming a plurality of generally circumferential scores between a stem end and a stylar end of a citrus fruit. Preferably each score extends at least through a flavedo of a peel of the fruit. Next the fruit is cut into a plurality of slices in a direction normal to a longitudinal axis defined by the stem end and the stylar end. The slices are then frozen, and an impulsive force is applied to the slices to form a plurality of fruit components. These fruit components comprise juice vesicles and other fruit components, such as the peel, connective membranes, and seeds. The juice vesicles are then mechanically separated from the other fruit components.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 is a side perspective view of a fruit oriented for slicing and the resulting slices.

FIG. 4 is a top plan view of a citrus fruit slice.

DETAILED DESCRIPTION OF THE PREFERRED EMBODIMENTS

Figure 1:
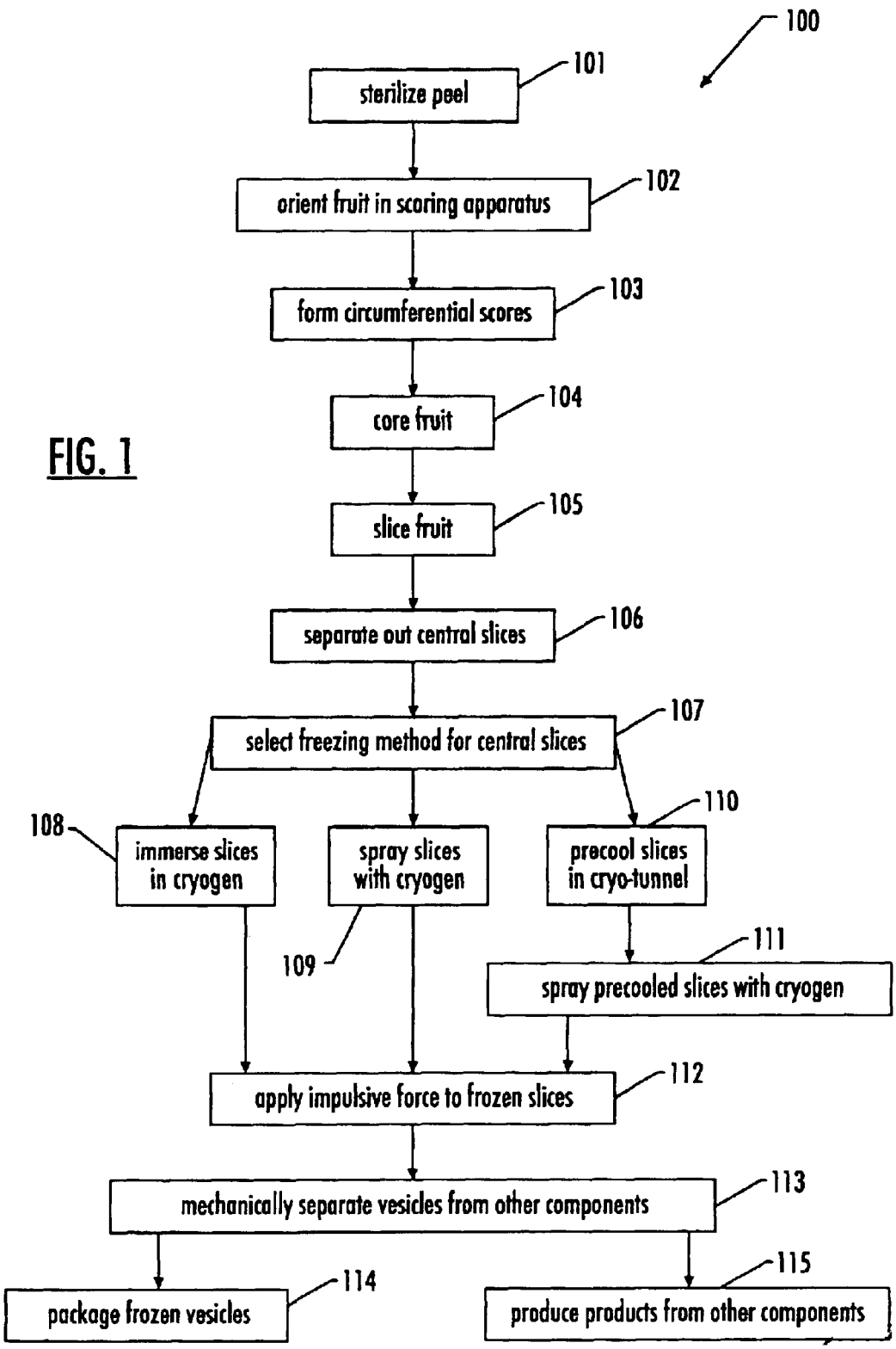
FIG. 1 is a flowchart of the vesicle separation method of the present invention.
Figure 2:
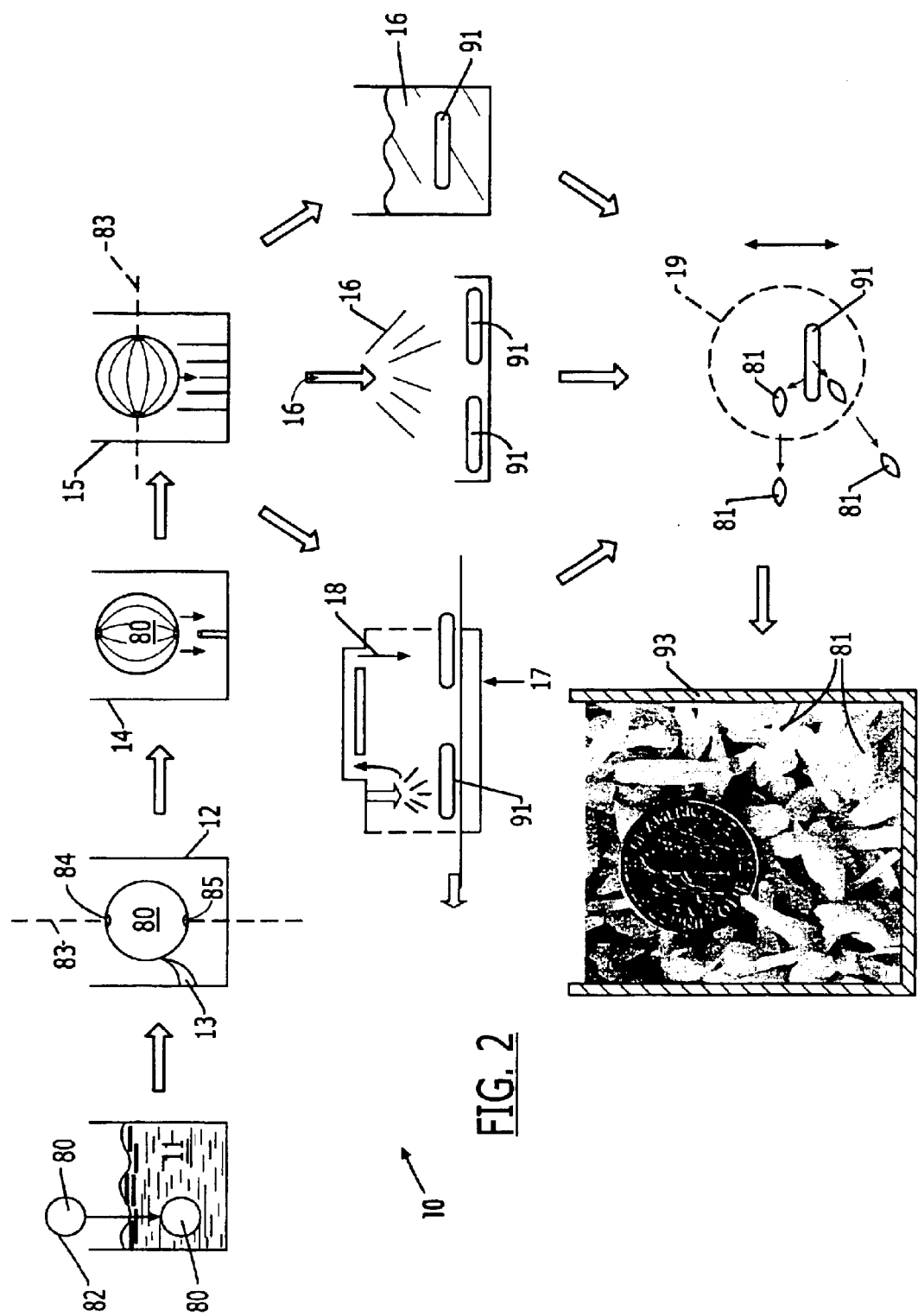
FIG. 2 is a schematic diagram of the system of the present invention.

A description of the preferred embodiments of the present invention will now be presented with reference to FIGS. 1–4. The method of the present invention is illustrated in flowchart form in FIG. 1, with the system components illustrated schematically in FIG. 2.

The present invention includes a method 100 and system 10 for separating juice vesicles 81 from a citrus fruit 80. Preferably a first step comprises sterilizing the peel 82 of the citrus fruit 80 (block 101). The sterilizing may take the form of performing at least one of a thermal and a chemical decontamination. An exemplary sterilization comprises immersing the citrus fruit 80 in hot water 11 (e.g., ~80° C.) for 1 minute. Preferably the sterilization should achieve a 5-log reduction of undesired microorganisms on the peel 82. Additional exemplary surface treatment methods are detailed in publications by two of the present inventors [S. Pao and C. L. Davis , *J. Food Protection* 62(7), 756–60, 1999; *Dairy, Food and Environmental Sanitation* 21(4), 287–91, 2001].

Next the citrus fruit 80 is positioned in a scoring apparatus 12 (block 102), with blades 13 thereof oriented substantially parallel to a longitudinal axis 83 defined by a stem end 84 and a stylar end 85 of the citrus fruit 80. The scoring apparatus 12 is then used to form a plurality of generally circumferential scores 86 between the stem end 84 and the stylar end 85 (block 103; FIG. 3). Preferably each score 86 extends at least through the peel flavedo 82 to a depth, depending upon the variety of the citrus fruit 80 being processed, in a range of approximately ⅛–⅜ inch (FIG. 4). In a preferred embodiment the formed scores 86 are separated by a spacing 87 adjacent an equator 79 of the citrus fruit 80 in a range of approximately 0.25–1 inch.

In a particular embodiment, the citrus fruit 80 is then cored (block 104) by a corer 14.

Next a slicer 15 is used to cut the fruit into a plurality of slices (block 105). The slicing is preferably performed in a direction normal to the longitudinal axis 83. The slices are preferably cut to an axial width 88 in a range of approximately ¼–½ inch. An exemplary slicer 15 comprises one such as known in the art for slicing tomatoes, although this is not intended as a limitation.

In order to optimize flavor retention, an upper end slice 89 comprising the stem end 84 and a lower end slice 90 comprising the stylar end 85 are separated out from the central slices 91 between the upper end slice 89 and the lower end slice 90 (block 106). This step improves flavor of the resulting product since the vesicles 81 tend to be dryer and less flavorful adjacent the fruit ends 84,85. Thus is the orientation step beneficial; in addition, the orientation of the fruit 80 also improves juice vesicle 81 integrity, as the vesicles 81 are substantially oriented normal to the longitudinal axis 83; so the slicing step tends to occur generally along a long axis of the vesicles 81, leaving the vast majority of the vesicles intact.

Next the central slices 91 are frozen (block 107), a step that is capable of being more rapid than other methods known in the prior art owing to the slicing step, which increases the surface area per unit volume being exposed to the freezing means. The freezing may comprise exposing the slices 91 to a cryogen 16 having a temperature no greater than −40° C. The exposing may take the form of immersing the slices 91 in the cryogen 16 (block 108) or spraying the slices 91 with the cryogen 16 (block 109). In a particular embodiment the slices 91 are channeled through a cryo-tunnel 17 adapted to precool the slices 91 with exhaust gases 18 from the cryogen 16 in counter-current fashion (block 110), by means well known in the art, and then spraying the cryogen 16 onto the precooled slices 91 (block 111). A benefit of the increased rapidity of the method of the present invention is the requirement for less cryogen than in prior methods.

An impulsive force is then applied to the frozen slices 91 (block 112) to form a plurality of fruit components comprising juice vesicles 81 and other fruit components, such as peel, seeds, locular membrane, and vascular tissue. This step may take the form of, for example, alternately applying an acceleration and a stopping impulse, which may comprise applying linear or centrifugal acceleration. The force-applying step is preferably carried out under freezing conditions.

Next the juice vesicles 81 are mechanically separated from the other fruit components, such as by sifting with a sifting screen 19 (block 113), again preferably under freezing conditions. In a particular embodiment, the sifting screen 19 may also be used as the means for applying force to impact the frozen slices 91.

Finally, the juice vesicles 81 are packaged 93 in a frozen condition (block 114) for subsequent consumption. A U.S. dime is shown in the package 93 to provide an indication of the size of the juice vesicles 81. Exemplary applications of the juice vesicles 81 include, but are not intended to be limited to, their use as toppings for salads, frozen and nonfrozen desserts, meats, fish, and vegetables; as an addendum to drinks; alone or in combination with other comestibles as a condiment; and in sauces, cereals, gelatin desserts, or fruit bars. The vesicles 81 may be used frozen or thawed.

The other fruit components may also be retained for subsequent production of additional products therefrom (block 115). For example, the end slices 89,90 can be used to produce peel oil or marmalade, these slices 89,90 being of a higher quality than in prior art methods owing to the absence of acid or alkali solutions. The sifted-out peel and seeds can be used to extract useful phytochemicals.

As the present method employs neither acid nor alkali solutions, which are known to produce a bland-flavored product, flavor retention is significantly improved. Additionally, as there is less handling than in prior known methods, there is less chance for contamination. Finally, limiting the number of steps lowers the production costs, resulting in a monetary savings.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are byway of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for separating juice vesicles from a citrus fruit comprising the steps of:
    forming a plurality of generally circumferential scores between a stem end and a stylar end of a citrus fruit, each score extending at least through a flavedo of a peel of the fruit;
    cutting the fruit into a plurality of slices in a direction normal to a longitudinal axis defined by the stem end and the stylar end;
    freezing the slices;
    applying an impulsive force to the slices to form a plurality of fruit components comprising juice vesicles and other fruit components; and
    mechanically separating the juice vesicles from the other fruit components.

2. The method recited in claim 1, wherein the formed score has a depth in a range of approximately ⅛–⅜ inch.

3. The method recited in claim 1, wherein the formed scores are separated by a spacing adjacent an equator of the citrus fruit in a range of approximately 0.25–1 inch.

4. The method recited in claim 3, wherein the slices are cut to an axial width in a range of approximately 0.25–0.5 inch.

5. The method recited in claim 1, further comprising the step, following the cutting step, of separating out an upper end slice comprising the stem end and a lower end slice comprising the stylar end from central slices between the upper end slice and the lower end slice, and wherein the freezing step comprises freezing the central slices.

6. The method recited in claim 1, wherein the freezing step comprises exposing the slices to a cryogen.

7. The method recited in claim 6, wherein the cryogen has a temperature no greater than −40° C.

8. The method recited in claim 6, wherein the exposing step comprises one of the steps of immersing the slices in cryogen and spraying the slices with cryogen.

9. The method recited in claim 6, wherein the exposing step comprises channeling the slices through a cryo-tunnel adapted to precool the slices with exhaust gases from cryogen.

10. The method recited in claim 9, further comprising the step, prior to the freezing step, of coring the citrus fruit.

11. The method recited in claim 1, wherein the force-applying step comprises alternately applying an acceleration and a stopping impulse.

12. The method recited in claim 1, wherein the force-applying step comprises applying one of linear and centrifugal acceleration.

13. The method recited in claim 1, wherein the separating step comprises the step of sifting.

14. The method recited in claim 1, wherein the force-applying and the separating steps comprise impacting the slices with a sifting screen.

15. The method recited in claim 1, wherein the force-applying and the separating steps are carried out under freezing conditions.

16. The method recited in claim 1, further comprising the step, prior to the score forming step, of sterilizing the peel.

17. The method recited in claim 16, wherein the sterilizing step comprises performing at least one of a thermal and a chemical decontamination.

18. The method recited in claim 1, further comprising the step, following the separating step, of packaging the juice vesicles in a frozen condition for subsequent consumption.

19. The method recited in claim 1, further comprising the step, following the separating step, of retaining the other fruit components for subsequent production of additional products therefrom.

* * * * *